July 9, 1968     M. A. CARDOSO     3,391,746
HELICOPTER CONTROL SYSTEM
Filed May 15, 1967     3 Sheets-Sheet 1
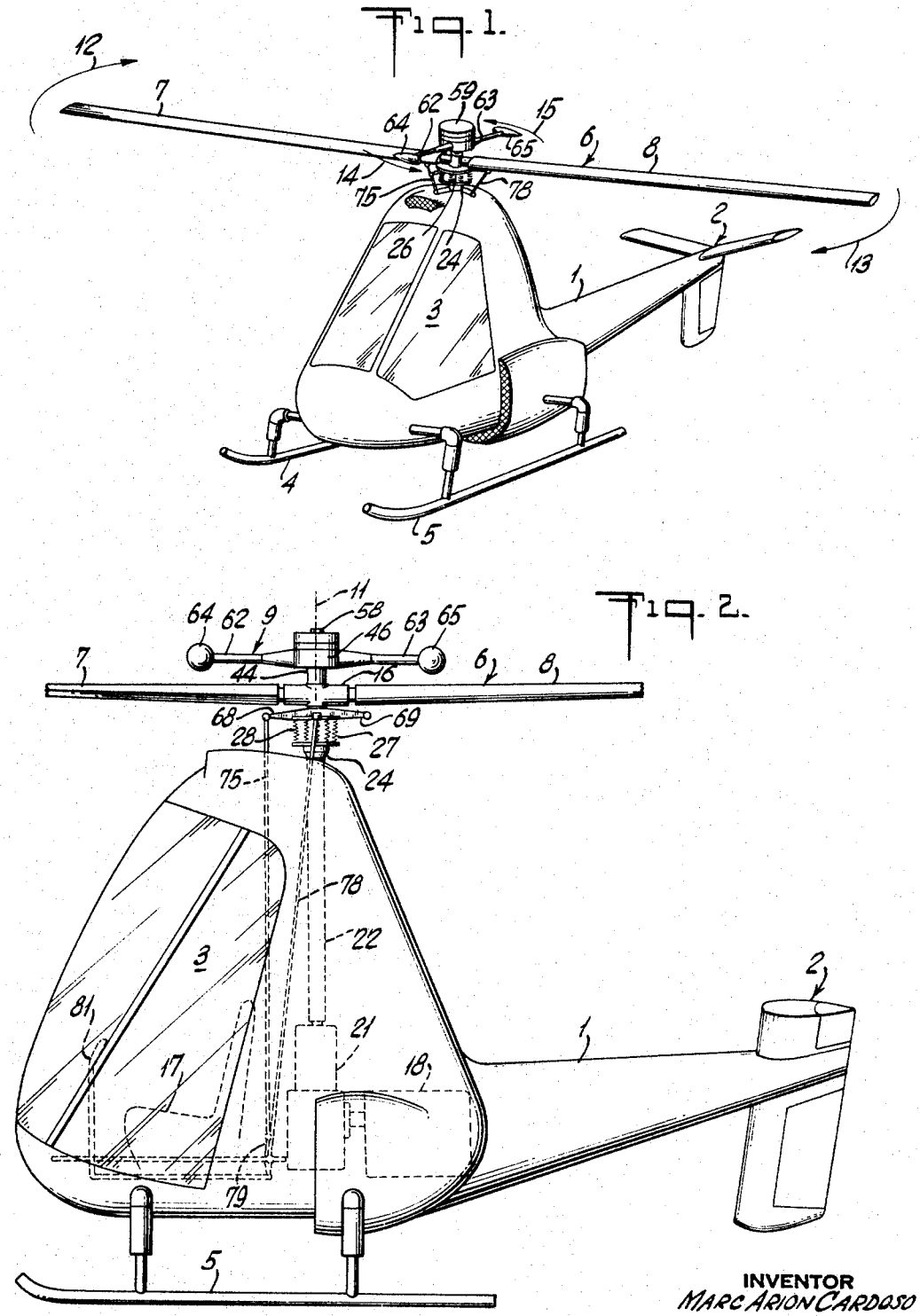
INVENTOR
MARC ARION CARDOSO
BY
Nolte & Nolte
ATTORNEYS

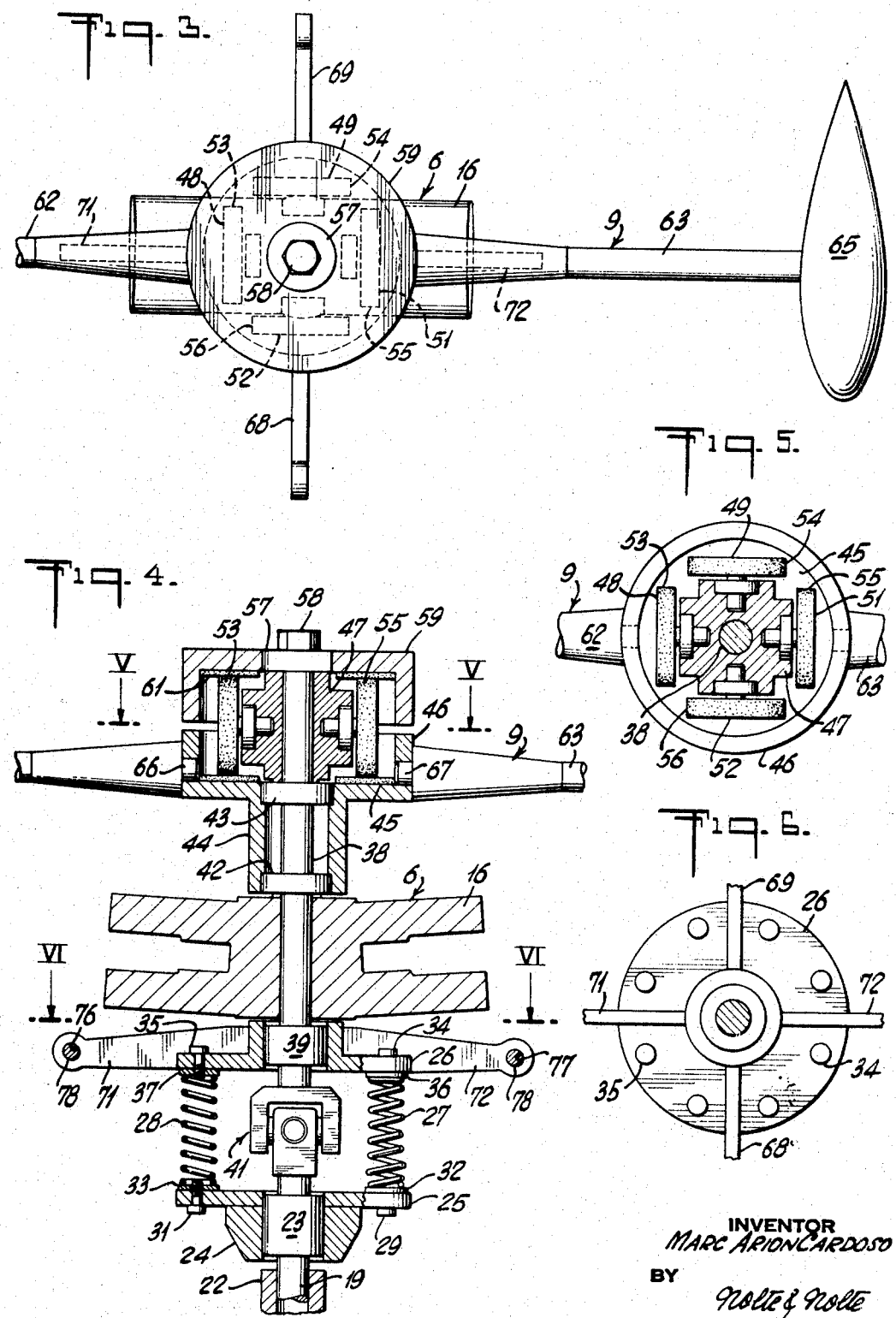

July 9, 1968 M. A. CARDOSO 3,391,746
HELICOPTER CONTROL SYSTEM
Filed May 15, 1967 3 Sheets-Sheet 3

INVENTOR
MARC ARION CARDOSO
BY
Nolte & Nolte
ATTORNEYS

United States Patent Office 3,391,746
Patented July 9, 1968

1

3,391,746
HELICOPTER CONTROL SYSTEM
Marc A. Cardoso, Bronx, N.Y., assignor to
Samuel Chayes, Bronx, N.Y.
Filed May 15, 1967, Ser. No. 638,321
12 Claims. (Cl. 170—160.13)

ABSTRACT OF THE DISCLOSURE

A rotor mounted on the fuselage of a helicopter is rotated about an axis to control the direction of flight of the helicopter. A mass is rotated about the axis of rotation of the rotor in counterrotation with the rotor. The rotor and mass are mounted for universal variation of the position of the axis of the rotor and the mass relative to a vertical line.

Background of the invention (A) *Field of the invention.*—The present invention relates to a helicopter control system. More particularly, the invention relates to a helicopter control system for controlling the direction of flight of a helicopter by control of the lifting rotor.

(B) *Description of the prior art.*—A helicopter is an aircraft that sustains itself by motor-driven horizontal rotating blades (rotors) that accelerate the air downward, thereby providing a reactive lift force, or if the blades accelerate the air at an angle to the vertical, providing lift and thrust. Although many different arrangements of lifting rotors have been developed, the ones which have received practical application are dual rotors placed in tandem, a single main lifting rotor with an anti-torque vertically disposed rotor, and two counter-rotating lifting rotors coaxially mounted.

In aeronautical development, the helicopter represents a logical progression from the autogiro by the use of the lifting rotor for forward propulsion and in turn serves as the link to the convertiplane which uses rotors or similar devices for vertical lift combined with other methods of forward propulsion in order to obtain increased speed.

The advantages of the helicopter over more traditional fixed-wing aircraft lie in its ability, by virtue of its vertical rising capability, to operate in very confined areas without the necessity of runways or other terminal facilities, coupled with its ability, by employing autorotation, to descend safely in the event of power failure. Although many slow-speed aircraft such as the autogiro have been designed, the helicopter remains uniquely capable of backing or sliding sideways into its confined landing area or hovering for prolonged periods over a fixed point.

Vertical lift and forward propulsion of the helicopter are supplied by a lifting rotor or rotors, operating on a vertical axis. The rotor consists of several blades designed as airfoils and rotated in a horizontal plane; their lift is varied by changing the angle at which the blades are mounted to the axis by means of pitch control. Because the rotors are operating at different air speeds as they progress around the disk, it is necessary to vary their lift effect in order to maintain uniform lift throughout the rotor disk as well as for control and stability. This is achieved by a hinge for the rotors and a variation of pitch in a cyclic direction, this same feature being employed to obtain the horizontal component of force required for forward motion. The pitch variation has the aerodynamic effect of tilting the rotor disk in the direction of flight, although physically the axis remains practically vertical. This variable pitch is known as cyclic or feathering action and requires decrease in pitch on the blade traveling in the same direction as the helicopter, and hence at a higher relative air speed to fuselage, and an increase in pitch with the retreating blade traveling in opposition to the fuselage itself. One of the prime differences between the helicopter rotor systems employed by various organizations and engineers lies in the method of achieving this variation in pitch in a cyclic sense without creating undesirable forces on the mast or drive shaft.

A satisfactory solution to this problem lies in hinging the rotor blades in both the horizontal and vertical planes as well as varying the pitch of the blade-carrying socket as it progresses around the circle. On smaller machines, it has been found possible to eliminate the hinges by allowing the rotor blade to bend.

The basic theory of rotor aerodynamics follows propeller theory closely, although further refinement in the design to take into consideration the fundamental differences between rotor blades and propellers has been initiated. Rotor blades themselves are constructed of metal, wood, plastics, and other materials. The smaller machines have employed metal blades of various designs increasingly in recent times. In general, the rotor blade consists of a rather heavy spar, required not only for the normal bending and other stresses experienced in fixed wings, but also for the added centrifugal forces experienced in the rotating airfoil. The airfoil itself is constructed of wraparound designs using either small pockets or sheets of aluminum, plastic, or even lightweight steel and titanium to form the aerodynamic surfaces.

Most helicopters are powered by modified versions of standard aircraft reciprocating engines.

Summary of the invention

The principal object of the present invention is to provide a new and improved helicopter control system. The helicopter control system of the present invention is simple in structure, but sturdy, reliable, safe, efficient and effective in operation. The helicopter control system of the present invention controls the direction of flight by a simple device, which is sturdy, reliable, efficient and effective in operation. The helicopter control system of the present invention controls the direction of flight of the helicopter via the lifting rotor and requires no other rotors for its operation. The helicopter control system of the present invention eliminates the antitorque rotor required on helicopters of the prior art. The helicopter control system of the present invention provides antitorque forces by a simple device, which is sturdy, reliable, safe, efficient and effective in operation. The helicopter control system of the present invention positions the lifting rotor in its hovering position upon relinquishment of manual control thereover. The helicopter control system of the present invention eliminates the requirement for pitch variation of the blades of the lifting rotor of helicopters of the prior art.

In accordance with the present invention, a helicopter has a fuselage and a rotatably mounted rotor on the fuselage for controlling the direction of flight of the helicopter. The helicopter control system of the present invention comprises a drive coupled to the rotor for rotating the rotor about an axis. A mass is mounted for rotation about the axis and a mass drive coupled to the mass rotates the mass about the axis in counterrotation with the rotor.

The drive comprises a motor and a drive shaft coupled to the motor. The mass drive comprises a first hub affixed to and rotatable with the drive shaft, a second hub coaxially positioned on the drive shaft around the first hub and freely rotatable about the axis of rotation of the rotor and a coupling coupling the first and second hubs to each other for counterrotation.

The second hub includes friction surfaces substantially perpendicular to the axis of rotation of the rotor. The coupling comprises a plurality of wheels having peripheral friction surfaces, each of the wheels being rotatably mounted on the first hub for rotation about a radially extending axis with its peripheral friction surface in driving engagement with the friction surface of the second hub.

The drive comprises a motor, a power shaft coupled to the motor, a drive shaft and a universal joint coupling the drive shaft to the power shaft. A mount for universally varying the position of the axis of rotation of the rotor and the mass relative to a vertical line comprises a resilient coupling coupling the power shaft to the drive shaft in proximity with the universal joint. The mass drive comprises a coupling coupling the mass to the drive shaft for counterrotation therewith. A position varying device affixed to the drive shaft permits manual variation of the position of the axis of rotation of the rotor and the mass relative to a vertical line.

The amount comprises a first plate affixed to the end of the power shaft adjacent the universal joint and substantially perpendicular to the axis of the power shaft, a second plate spaced from the first plate and affixed to the end of the drive shaft adjacent the universal joint and substantially perpendicular to the axis of the drive shaft and a resilient coupling between the first and second plates. In one embodiment of the invention, the resilient coupling comprises a plurality of springs equiangularly spaced from each other. In a modification, the resilient coupling comprises a substantially annular collar of elastomeric material. The elastomeric material may have perforations formed therethrough and reinforcements therein.

*Brief description of the drawings*

In order that the present invention may be readily carried into effect, it will now be described with reference to the accompanying drawings, wherein:

FIG. 1 is a perspective view of an embodiment of the helicopter control system of the present invention as utilized on a helicopter;

FIG. 2 is a side view of the embodiment of FIG. 1 as utilized on a helicopter;

FIG. 3 is a top view illustrating part of the antitorque device of the helicopter control system of the present invention;

FIG. 4 is a side view, partly in section, of part of the embodiment of the helicopter control system of FIGS. 1 and 2;

FIG. 5 is a view taken along the lines V—V of FIG. 4;

FIG. 6 is a view taken along the lines VI—VI of FIG. 4;

*Description of the preferred embodiment*

Figure 7:
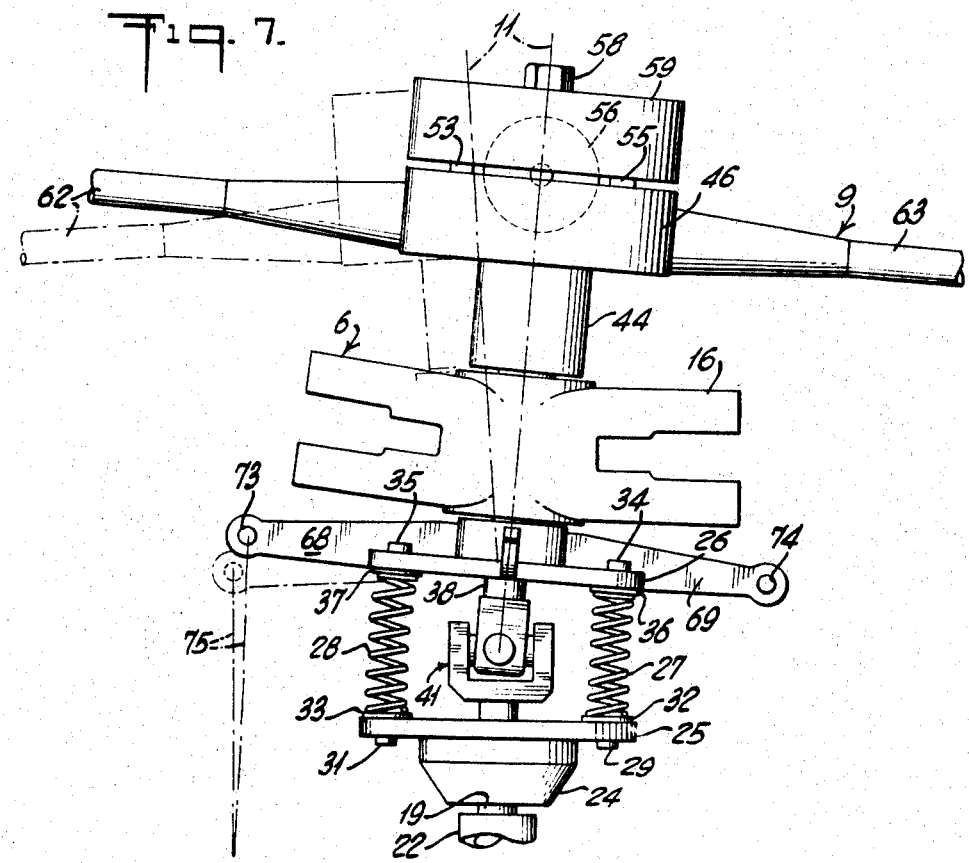
FIG. 7 is a side view of part of the embodiment of the helicopter control system of FIGS. 1 and 2 illustrating the operation of the flight direction control device of such system.

In the figures, the same components are identical by the same reference numerals.

In accordance with the present invention the helicopter control system comprises an antitorque device, which eliminates the need for an antitorque rotor, and a flight direction control device, which controls the direction of flight of the helicopter by the rotor without the necessity for varying the pitch of the blades of such rotor. The direction of flight includes ascent, descent and flight in any direction. The rotor referred to herein is intended to mean the lifting rotor.

The antitorque device of the present invention comprises a mass which is in counterrotation with the rotor on the same axis of rotation as the rotor. The flight direction control device of the present invention comprises manual control apparatus for varying the position of the axis of rotation of the rotor and the mass relative to a vertical line, and a mount which positions the rotor in its hovering position in the event that manual control is relinquished. This insures complete safety in the event of disability of the pilot or flight direction control system.

The helicopter shown in FIGS. 1 and 2 comprises a fuselage 1, which has a fixed tail structure 2, a cabin 3 and support runners 4 and 5. A rotor 6, having a pair of blades 7 and 8, is rotatably mounted on top of the cabin 3 of the fuselage 1. The rotor 6 functions in the usual manner to lift the helicopter.

A mass 9 is rotatably mounted above the rotor 6 for rotation about the axis of rotation 11 (FIG. 2) of said rotor. The rotor 6 and the mass 9 are rotated in counterrotation about the axis 11. Thus, as indicated in FIG. 1 by arrows 12 and 13, if the rotor 6 rotates clockwise about the axis 11, the mass 9 rotates counterclockwise about said axis, as indicated by arrows 14 and 15. The mass 9 is sufficient to compensate for any tendency of the fuselage 1 to rotate in a horizontal plane due to the rotary force of the rotor 6. The mass 9 thus replaces the antitorque rotor utilized on the tails of helicopters of the prior art and performs the function performed by such antitorque rotor.

The direction of flight is controlled by varying the position of the axis 11 relative to a vertical line, as shown in FIG. 7. The rotor 6 and the mass 9 are varied in position by the variation in position of the shaft driving said rotor and said mass, since the variation of the position of said shaft varies the position of the axis 11 of rotation. In FIG. 7, one position of the axis 11, rotor and mass 9 is illustrated by solid lines and another position of said axis, rotor and mass is illustrated in broken lines. The rotor 6 is represented in FIG. 7 by its mounting hub 16.

The pilot may sit on a seat 17 (FIG. 2) in the cabin 3. A power plant or aircraft motor 18 is mounted in the cabin 3 behind the seat 17 and drives a power shaft 19 (FIGS. 4 and 7) via a suitable coupling 21. The power shaft 19 is covered by a casing 22 (FIGS. 2, 4 and 7) and drives the drive shaft to rotate the rotor 6 and the mass 9 in a manner hereinafter described. The area of the upper end of the power shaft 19 is rotatably mounted in a bearing 23 (FIG. 4) which is affixed to the fuselage 1 in a part 24 of said fuselage (FIG. 4) in a manner whereby said power shaft may rotate freely about its axis of rotation, but may not move in an axial direction more than a normal distance, so that said power shaft cannot be pulled from said fuselage.

A first plate 25 (FIGS. 4 and 7), which may be of disc-like configuration, is affixed to the top of the fuselage 1 and has a center aperture formed therethrough through which the power shaft 19 passes. A second plate 26 (FIGS. 2, 4, 6 and 7), which may be of disc-like configuration, is spaced from the first plate 25 and is resiliently, elastically or yieldably coupled to said first plate by a plurality of equiangularly spaced helical springs 27, 28, and so on (FIGS. 4 and 7).

The first and second plates 25 and 26 and the resilient coupling between them function as a resilient mount. The springs 27, 28 and so on, are affixed at one end of each of said springs to the first plate 25 by any suitable fastening means such as, for example, by welding or by bolts 29, 31, and so on, and corresponding nuts 32, 33, and so on (FIG. 4). The springs 27, 28, and so on, are affixed at the other end of each of said springs to the second plate 26 by any suitable fastening means such as, for example, by welding or by bolts 34, 25, and so on, and corresponding nuts 36, 37, and so on (FIG. 4). The nuts 32, 33, 36, 37, and so on may be welded to the corresponding plates.

A drive shaft 38 is rotatably mounted in a bearing 39 (FIG. 4) affixed to the second plate 26. The power shaft 19 and the drive shaft 38 are coupled to each other by a universal joint 41 (FIG. 4) of any suitable type in proximity with the springs 27, 28, and so on, and between the first and second plates 25 and 26. The universal coupling or joint 41 is surrounded by the springs 27, 28, and so on. The second plate 26 has a center aperture formed therethrough through which the drive shaft 38 passes.

A pair of spaced bearings 42 and 43 are affixed to the drive shaft 38 above the rotor blade hub 16 (FIG. 4). A mass hub 44 (FIGS. 4 and 7) is mounted on the bearings 42 and 43 for free rotation about the axis 11 of rotation of the rotor 6 and mass 9. The mass hub 44 comprises friction surface or rollerway 45 which is of substantially disc-like configuration having a center aperture and is substantially perpendicular to the axis 11, and which is surrounded by an annular collar 46 (FIGS. 4 and 5).

A drive hub 47 (FIGS. 4 and 5) is affixed to and rotates with the drive shaft 38. The drive hub 47 and the mass hub 44 are coaxially positioned, with said mass hub around said drive hub. A plurality of equiangularly spaced wheels 48, 49, 51 and 52 (FIG. 5) having peripheral friction surfaces 53, 54, 55 and 56, respectively (FIG. 5) are rotatably mounted on the drive hub 47 for rotation about radially extending axes with their said peripheral friction surfaces in driving engagement with the friction surface 45 of the mass hub 44.

The peripheral friction surfaces 53, 54, 55 and 56 of the wheels 48, 59, 51 and 52 and the friction surface 45 are coated with an abrasive, friction-inducing material to provide a strong frictional engagement of said wheels with said surface. The rotation of the drive shaft 38 rotates the rotor 6 in the same direction as said drive shaft 38 via the rotor hub 16 and rotates the drive hub 47 in the same direction. Rotation of the drive hub 47 rotates the wheels 48, 49, 51 and 52 about their axes in the direction of rotation of said drive hub and the engaging surfaces of said wheels and the friction surface 45 of the mass hub 44 causes said mass hub to rotate in a counter direction relative to said drive shaft. The mass 9, which is affixed to the mass hub 44, as hereinafter described, and the rotor 6, which is affixed to the drive shaft 38, are thus counterrotated.

The frictional drive coupling may be replaced by any suitable coupling such as, for example, a suitable gear coupling or the like. A retaining cap 57 (FIG. 4) may be affixed to the drive shaft 38 by a bolt 58 (FIG. 4), for example, to maintain the drive hub 47 on the drive shaft 38. A retaining house 59 may be utilized as a part of the mass hub 44 in order to cover the wheels 48, 49, 51 and 52 and to provide an additional friction surface 61 (FIG. 4).

The mass 9 comprises a pair of diametrically opposed extending arms 62 and 63 (FIGS. 1, 2, 3, 4, and 7). A first weight or mass 64 is affixed to the end of the arm 62 and a second weight 65 is affixed to the end of the arm 63 (FIGS. 1 and 2). The weights 64 and 65 are calibrated and are identical and are calculated, with the arm 62 and 63 lengths, to provide the necessary antitorque force or torque. The arms 62 and 63 are affixed to the annular collar 46 of the mass hub 44 by any suitable fastening means such as, for example, by welding, bolts and nuts or pegs or the like 66 and 67, respectively (FIG. 4).

A pair of arms 68 and 69 (FIGS. 2, 3, 4, 6 and 7) are affixed to the second plate 26 by any suitable means and may be integrally formed with said second plate. The arms 68 and 69 extend in diametrically opposed directions. Another pair of arms 71 and 72 (FIGS. 3 and 6) may be added to extend from the annular collar 46 of the mass hub 44 at right angles to the arms 68 and 69. The ends of the arms 68 and 69 have eyes 73 and 74 formed therein to accommodate control rods such as, for example, push pull torque tubes 75 (FIGS. 1, 3 and 7) and the ends of the additional arms 71 and 72 have eyes 76 and 77 (not shown) formed therein to accommodate such control rods, such as, for example, 78 (FIG. 2).

The control rod 75 is affixed to the arm 68 and the control rod 78 is affixed to the arm 72 (FIGS. 2 and 3) and said control rods are coupled by a rod and linkage coupling mechanism 79 (FIG. 2) to a control stick 81 (FIG. 2). Movement of the control stick 81 by the pilot thus moves the drive shaft 38 to a corresponding position relative to a vertical line, so that the pilot thereby manually varies the position of said drive shaft and thus the axis of rotation of the rotor 6 and the mass 9 relative to the vertical. If the control stick 81 is released, the springs 27, 28, and so on, return the drive shaft 38 to the position shown in FIG. 4 and the helicopter hovers, safely.

Figure 8:
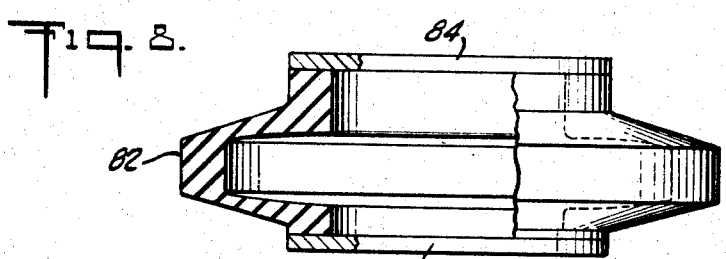
FIG. 8 is a side view, partly in section, of a modification of part of the flight direction control device of FIGS. 1 and 2.
Figure 9:
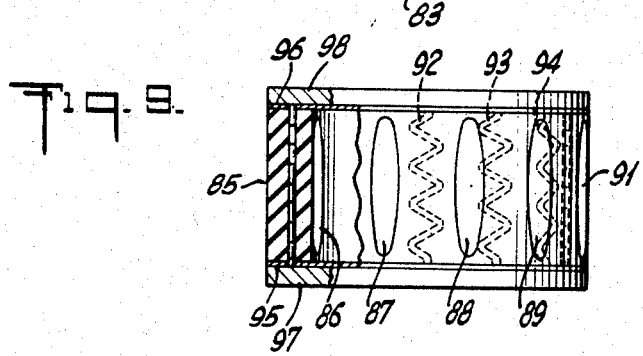
FIG. 9 is a side view, partly in section, of another modification of the part of the flight direction control device shown in FIG. 8.

FIGS. 8 and 9 illustrate modifications of the embodiment of the helicopter control system of the present invention shown in FIGS. 1 to 7. In the modifications of FIGS. 8 and 9, the plurality of springs 27, 28, and so on, of the resilient mount of the flight direction control device of the present invention are replaced by elastomeric material of substantially annular configuration.

In FIG. 8, the elastomeric material 82 may comprise, for example, rubber. A first end plate 83 of substantially disc-like configuration is bonded by any suitable means to the lower annular surface of the elastomeric material 82. A second end plate 84, spaced from the first end plate 83, of substantially disc-like configuration is bonded by any suitable means to the upper annular surface of the elastomeric material 82. The first end plate 83 may be affixed to the first plate 25 of the embodiment of FIGS. 1 to 7 by any suitable means such as, for example, bolts and nuts. The second end plate 84 may be affixed to the second plate 26 of the embodiment of FIGS. 1 to 7 by any suitable means such as, for example, bolts and nuts.

In FIG. 9, an annular configuration of elastomeric material 85 such as, for example, rubber, has a plurality of perforations 86, 87, 88, 89 and 91, and so on, formed therethrough substantially equiangularly spaced from each other. A plurality of reinforcing fibers 92, 93 and 94, and so on, are provided in the elastomeric material 85 and may comprise any suitable reinforcing material such as, for example, metal or nylon. The reinforcing fibers 92, 93 and 94, and so on, are joined at their ends to first and second intermediate plates 95 and 96. The first intermediate plate 95 is affixed to a first end plate 97 by any suitable means and the second intermediate plate 96 is affixed to a second end plate 98 by any suitable means. The first end plate 97 may be affixed to the first plate 25 of the embodiment of FIGS. 1 to 7 by any suitable means such as, for example, bolts and nuts. The second end plate 98 may be affixed to the second plate 26 of the embodiment of FIGS. 1 to 7 by any suitable means such as, for example, bolts and nuts.

The end plates 83, 84, 97 and 98 of FIGS. 8 and 9 are identical and each has a center aperture formed therethrough to accommodate the corresponding one of the power shaft and drive shaft.

While the invention has been described by means of specific examples and in specific embodiments, I do not wish to be limited thereto, for obvious modifications will occur to those skilled in the art without departing from the spirit and scope of the invention.

What is claimed is:

1. A helicopter control system for a helicopter having a fuselage and a rotatably mounted rotor on said fuselage for controlling the direction of flight of said helicopter, said helicopter control system comprising driving means coupled to said rotor for rotating said rotor about an axis; antitorque means comprising a mass mounted for rotation about said axis; mass driving means coupled to said mass for rotating said mass about said axis in counterrotation with said rotor; and flight direction control means comprising mounting means for universally varying the position of the axis of rotation of said rotor and said mass relative to a vertical line.

2. A helicopter control system as claimed in claim 1, wherein said driving means comprises a motor and a drive shaft coupled to said motor, and said mass driving means comprises a first hub affixed to and rotatable with said drive shaft, a second hub coaxially positioned on said drive shaft around said first hub and freely rotatable about the axis of rotation of said rotor and coupling means coupling said first and second hubs to each other for counterrotation.

3. A helicopter control system as claimed in claim 2, wherein said coupling means comprises a friction coupling.

4. A helicopter control system as claimed in claim 2, wherein said second hub includes friction surface means substantially perpendicular to the axis of rotation of said rotor, and said coupling means comprises a plurality of wheels having peripheral friction surfaces, each of said wheels being rotatably mounted on said first hub for rotation about a radially extending axis with its peripheral friction surface in driving engagement with the friction surface of said second hub.

5. A helicopter control system as claimed in claim 1, wherein said driving means comprises a motor, a power shaft coupled to said motor, a drive shaft and a universal joint coupling said drive shaft to said power shaft, said mounting means comprises resilient coupling means coupling said power shaft to said drive shaft in proximity with said universal joint, and said mass driving means comprises coupling means coupling said mass to said drive shaft for counterrotation therewith.

6. A helicopter control system as claimed in claim 1, wherein said mounting means comprises a first plate affixed to the end of said power shaft adjacent said universal joint and substantially perpendicular to the axis of said power shaft, a second plate spaced from said first plate and affixed to the end of said drive shaft adjacent said universal joint and substantially perpendicular to the axis of said drive shaft and resilient means coupling said first and second plates to each other.

7. A helicopter control system as claimed in claim 6, wherein said resilient means comprises spring means.

8. A helicopter control system as claimed in claim 6, wherein said resilient means comprises a plurality of springs equiangularly spaced from each other.

9. A helicopter control system as claimed in claim 6, wherein said resilient means comprises elastomeric material.

10. A helicopter control system as claimed in claim 6, wherein said resilient means comprises a substantially annular collar of elastomeric material.

11. A helicopter control system as claimed in claim 6, wherein said resilient means comprises elastomeric material having perforations formed therethrough and reinforcements therein.

12. A helicopter control system for a helicopter having a fuselage and a rotatably mounted rotor on said fuselage for controlling the direction of flight of said helicopter, said helicopter control system comprising driving means coupled to said rotor for rotating said rotor about an axis, said driving means comprising a motor, a power shaft coupled to said motor, a drive shaft and a universal joint coupling said drive shaft to said power shaft; antitorque means comprising a mass mounted for rotation about said axis; mass driving means coupled to said mass for rotating said mass about said axis in counterrotation with said rotor, said mass driving means comprising a first hub affixed to and rotatable with said drive shaft, a second hub coaxially positioned on said drive shaft around said first hub and freely rotatable about the axis of rotation of said rotor, said second hub including friction surface means substantially perpendicular to the axis of rotation of said rotor, and friction coupling means coupling said first and second hubs to each other for counterrotation, said coupling means comprising a plurality of wheels having peripheral friction surfaces, each of said wheels being rotatably mounted on said first hub for rotation about a radially extending axis with its peripheral friction surface in driving engagement with the friction surface of said second hub; and flight direction control means comprising mounting means for universally varying the position of the axis of rotation of said rotor and said mass relative to a vertical line, said mounting means comprising a first plate affixed to the end of said power shaft adjacent said universal joint and substantially perpendicular to the axis of said power shaft, a second plate spaced from said first plate and affixed to the end of said drive shaft adjacent said universal joint and substantially perpendicular to the axis of said drive shaft and resilient means coupling said first and second plate to each other.

References Cited

UNITED STATES PATENTS

| | | | |
|---|---|---|---|
| 2,408,275 | 9/1946 | Shaeffer | 170—135.28 X |
| 2,949,254 | 8/1960 | Bauer | 170—160.27 X |
| 2,980,187 | 4/1961 | Smyth-Davila | 170—160.13 X |
| 3,080,001 | 3/1963 | Culver et al. | 170—160.26 X |

FOREIGN PATENTS

| | | |
|---|---|---|
| 21,384 | 1912 | Great Britain. |
| 272,962 | 11/1927 | Great Britain. |

EVERETTE A. POWELL, JR., *Primary Examiner.*